United States Patent [19]

Wiley

[11] 4,257,640
[45] Mar. 24, 1981

[54] DRAG REDUCER FOR LAND VEHICLES

[75] Inventor: Nathaniel C. Wiley, Weston, Conn.

[73] Assignee: Rudkin-Wiley Corporation, Stratford, Conn.

[21] Appl. No.: 866,260

[22] Filed: Jan. 3, 1978

Related U.S. Application Data

[63] Continuation-in-part of Ser. No. 641,222, Dec. 16, 1975, abandoned, and Ser. No. 779,086, Mar. 18, 1977, abandoned.

[51] Int. Cl.³ .............................................. B62D 35/00
[52] U.S. Cl. ..................................... 296/1 S; 105/2 R
[58] Field of Search ................... 296/1 S, 91; 105/2 R, 105/2 A, 2 B; 160/97; 244/130

[56] References Cited

U.S. PATENT DOCUMENTS

| 3,834,752 | 9/1974 | Cook | 296/1 S |
| 3,951,445 | 4/1976 | Tatom | 105/2 R |

Primary Examiner—John J. Love
Assistant Examiner—John A. Carroll
Attorney, Agent, or Firm—Mattern, Ware, Davis & Stoltz

[57] ABSTRACT

A drag reducer for a gap in a land vehicle moving through air which consists of a retractable or articulated baffle, spanning approximately the entire distance of the gap. The drag reducer can be used on all land vehicles and is readily adaptable for use on railroad box cars, truck semi-trailers, full trailers in tandem and vehicles towed by cars. The drag reducer can take the form of a fin mounted rigidly or with articulated joint or flexible material to allow for movement between the leading and trailing vehicles. It may also be of a retractable nature, such as an accordian arrangement, a roll-up screen, an inflatable fin, a folding plate, etc. The unit may be attached primarily to either the lead vehicle or trailing vehicle or both, however, in the case of tractor-trailer trucks, the bulk of the device is better kept with the tractor unit, because there are approximately one-third the number of tractors compared to trailers, resulting in substantial savings in the cost of equipping fleets of tractor-trailer rigs.

41 Claims, 25 Drawing Figures

DRAG REDUCER FOR LAND VEHICLES

RELATED APPLICATION

This application is a continuation-in-part of U.S. patent applications of Nathaniel C. Wiley, Jr., relating to Drag Reducer for Land Vehicles, bearing Ser. No. 641,222, filed Dec. 16, 1975, now abandoned, and Ser. No. 779,086, filed Mar. 18, 1977.

SUMMARY OF THE INVENTION

This invention relates to practical means for substantially closing off the entire gap area between the tractor and trailer of a semi-trailer or full trailer rig. Similar means may also be utilized in car-trailer combinations and railroad box cars.

The basic concepts and reasons for sealing this gap are taught in the W. S. Saunders U.S. Pat. No. 3,697,120. This patent points out that when a tandem type vehicle of conventional design encounters wind forces at yaw angles, the flow of air can pass laterally through the gap region, resulting in increased aerodynamic drag. This is caused by a flow separation and increased turbulence along the lee side of the following body. The effect is increased when the corners of the trailing body are sharp, chamfered or moderately radiused as in the case of present-day vehicles.

The concept of stabilizing the normal rotating vortex system in the gap region is well documented in the above referenced patent and, as the patent teaches, the ideal situation would be to completely close the gap by a stabilizer plate. However, the patent points out that due to the practicalities of maneuvering a tractor-trailer combination, it is only feasible to partially close the gap. For this reason, the full gap-sealer is illustrated only on non-articulated, or rigid chassis trucks. A substantially complete gap sealer is illustrated for two trailing vehicles such as railroad box cars. This approach can also be utilized in the case of trucks rigged to haul one semi-trailer plus one or more full trailers, however the geometry and pivot points in these types of trailers are such that an interference can come about unless the gap size is increased.

Previous means for substantially sealing the gap in semi-trailer trucks have consisted of rigid fins attached to the front face of the trailer. These fins have been dimensioned so as to fill as much of the gap as possible, consistent with the turning and pitching attitudes of tractor-trailer rigs in normal operation.

If one assumes an ideal condition consisting of a matched tractor and trailer which always run together as a set, and further assumes an almost perfectly flat roadbed, then the trailer mounted fin could, in fact, extend almost the entire distance from the front of the trailer, to the back of the tractor, without encountering an interference. This is true because the pivot point of a typical tractor and semi-tractor rig is located under the trailer and therefore in any turning maneuver on level ground, the tractor falls away from the leading vertical edge of the trailer-mounted fin. Further, there would be no pitching effect such as the tractor climbing a curb or inclined ramp while the trailer is still on level ground. This condition causes the gap to close at the top and could cause an interference at the top of the cab.

In actual trucking conditions, however, a rigid full gap vortex stabilizer is not practical because of the occasional pitching between tractor and trailer. Also the distance between the rear of the tractor and the front of the trailer is occasionally altered by the trucker, utilizing a sliding fifth-wheel. Therefore a rigid, trailer mounted vortex stabilizer might work properly when sized for a 60 inch gap, but would constitute an interference if the gap were closed by sliding the fifth-wheel assembly forward by, say, 12 inches.

This invention, then, relates to practical means for closing the gap between tractor units and trailer or trailing units. In the preferred embodiment, for tractor and semi-trailer rigs the gap sealing baffle is better attached to the rear of the tractor than the front of the trailer for economic reasons—there being roughly one tractor for every three trailers in general use and this ratio has consistently increased over the years.

A further feature of this invention is that the baffle is made to collapse, deflate, roll-up or otherwise deflect so as to eliminate or minimize the effect of the interference condition which would normally exist when the truck turned or pitched or did both simultaneously.

OBJECTS OF THE INVENTION

Therefore, an object of the invention is to provide a practical air resistance reducing apparatus in the form of a baffle or plate that is capable of substantially filling the gap between vehicles.

Another object is to provide means for retracting said baffle or causing it to move out of way when an interference condition exists.

A further object is to secure the unit to the tractor rather than the trailer in order to reduce total fleet costs.

Another object is to provide a transparent membrane so that driver visibility will not be reduced when backing the vehicle.

THE DRAWINGS

For a fuller understanding of the nature and objects of the invention, reference should be had to the following detailed description taken in connection with the accompanying drawings, in which.

SPECIFIC DESCRIPTION

Figure 1:
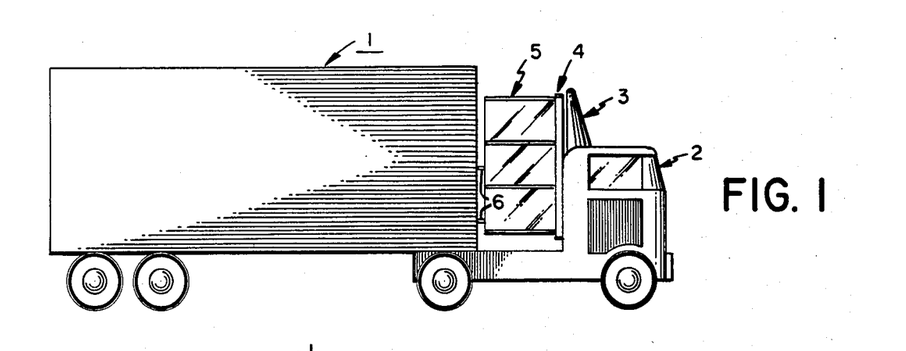
FIG. 1 is a side view of a standard tractor and semi-trailer with the apparatus according to the invention mounted in place.

Referring to the drawings, FIG. 1 illustrates a typical tractor-trailer rig in which a gap exists between tractor 2 and semi-trailer 1. In practice this gap may range anywhere from approximately twenty to one hundred inches depending upon various fleet and motor vehicle regulation requirements. The tractor in this case is fitted with a typical wind deflector 3, mounted at the rear of the roof, however the wind deflector 3 need not be present in order to obtain aerodynamic drag reduction advantages from the gap sealer. The gap sealer 5, is attached to a housing 4, which is in turn attached to tractor 2. The gap sealer and its housing comprise the bulk of the equipment, with only eye bolts or similar attachment hardware required for the front of the trailer. Snap-shackles/pintels or similar hooking hardware are attached to the trailing edge of the gap-sealer and engage the aforementioned eyebolts at attachment points 6.

Figure 2:
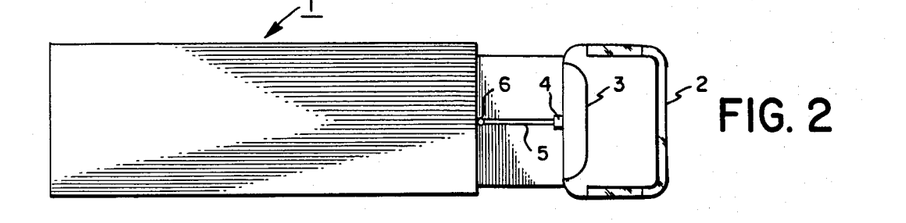
FIG. 2 is a top view of the tractor and semi-trailer of FIG. 1.

FIG. 2, illustrates the same equipment from a top view and item numbers correspond.

Figure 3:
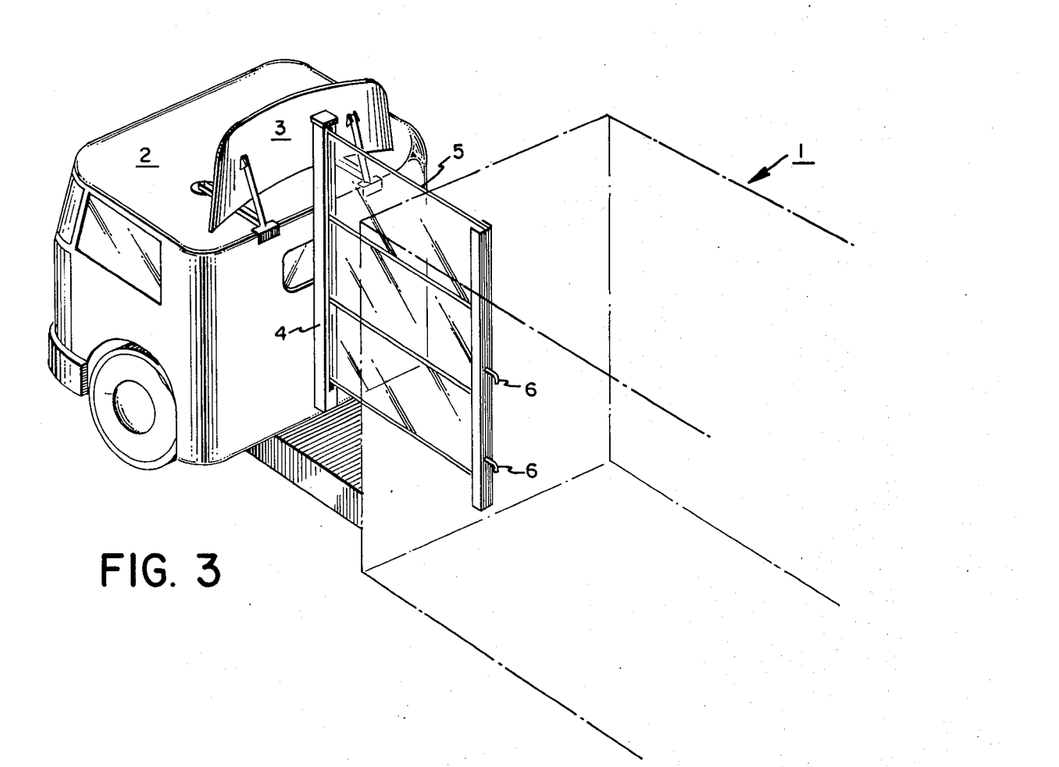
FIG. 3 is a perspective view of a gap-filler baffle mounted in place on a tractor-trailer equipped with a wind deflector. This unit may be extended or retracted by means of a roller.

FIG. 3, shows one form of the apparatus wherein the gap-sealer 5 is a flexible membrane. In this case the membrane is transparent however it may opaque, as well. The membrane is attached to a spring-loaded roller which is located within housing 4. The membrane is therefore under constant tension. When the tractor 2 turns in relation to trailer 1, the effective distance from housing 4 to fastening points 6 is increased. Extra membrane material stored on the roller, is pulled out from housing 4 and at the same time kept in tension. As the tractor trailer resumes a straight ahead attitude, the membrane material is retracted back into its housing by spring tension.

Also, when no trailer is attached to the tractor, the entire membrane 5, is retracted into the housing for convenient storage while the tractor is either parked or moving. When the tractor and trailer are pitched in relation to one another, the flexible membrane is capable of buckling at the top, while the lower edge is self-adjusting.

In some instances the tractor may turn to an attitude in exesss of 90° in relation to the center line of the trailer. In these cases, the flexible membrane bends around the corner of the trailer. Horizontal reinforcing strips are adhered to the membrane to resist excessive abrasion under these conditions.

Quick disconnect means 6 are provided at the trailing edge of the membrane.

Figures 4, 5:
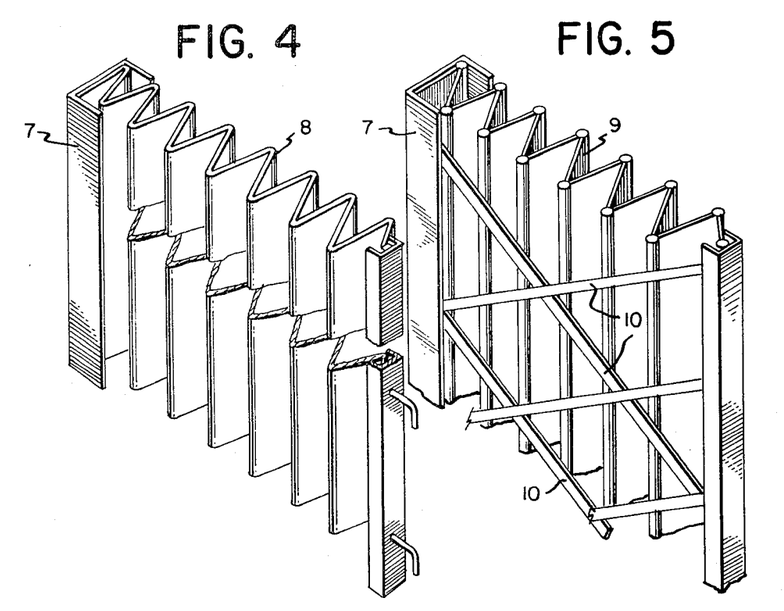
FIG. 4 is a perspective of a baffle unit similar to FIG. 3, but in the form of an accordian pleat.
FIG. 5 is a perspective of a baffle unit similar to FIG. 3, but in the form of a hinged, folded plate with scissor-type extension apparatus.

FIG. 4 illustrates a similar type of gap sealer wherein housing 7 is opened to the rear and accordian pleated material such as fabric reinforced flexible sheeting is provided. Internal splines and/or pre-formed or pre-molded accordian pleats in the closed position provide vertical stiffness. Telescoping or sissor type restraining apparatus such as shown in 10 of FIG. 5 may be provided.

FIG. 5, shows a hinged, folded-plate design, consisting of housing 7, folded plates 9 and sissor apparatus 10. This unit can be manually disengaged and placed in the retracted position when the tractor-trailer rig is maneuvering in tight turning situations such as city traffic and pick up and delivery. During these periods, the truck is operating at very low speeds when aerodynamic drag reduction is not a consideration.

Figure 6:
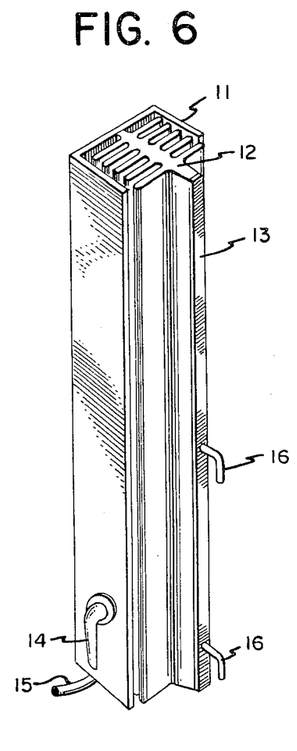
FIG. 6 is a perspective of a baffle unit similar to FIG. 3, but in the form of an extendible flexible bellows in its contracted form.
Figure 7:
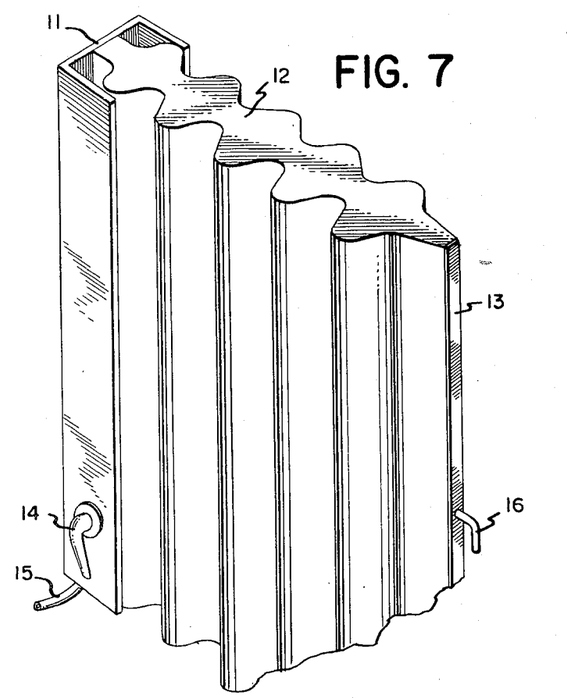
FIG. 7 is the same unit as FIG. 6, in its extended form.

FIG. 6 and FIG. 7 illustrate respectively the retracted and extended modes of an inflatable gap-filler. Open housing 11, contains the retracted bellows 12, and trailing rigid edge membrane 13. Fastening means 16 are provided for attachment to the trailer, however it would also be possible to dispense with the fastening means 16, if the bladder were constructed to become semi-rigid during the inflated mode. Compressed air from the tractors normal air supply is fed to the unit via pressure hose 15 through valve 14.

Figure 8:
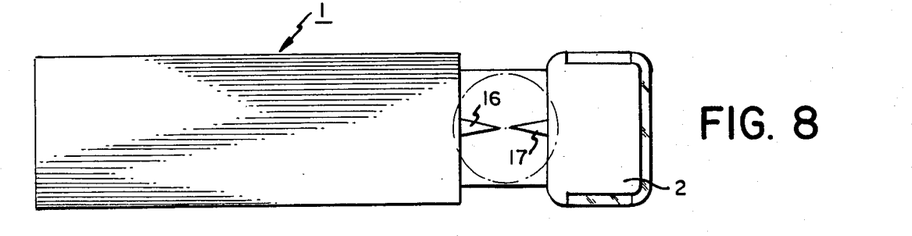
FIGS. 8 and 8a represent a form of rigid vortex stabilizers which are closed by means of a flexible fin.
Figure 8A:
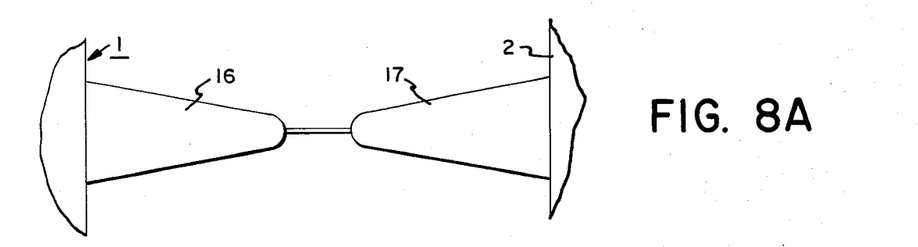

FIG. 8 and Detail 8a, illustrate a rigid vortex stabilizer attached to both front of trailer 16 and back of cab 17 with a flexible membrane attached to one unit or the other. The flexible membrane wipes past the nose section of the opposing vortex stabilizer in a turning situation. During normal straight ahead operation, the flexible membrane effectively seals the gap.

Figure 9:
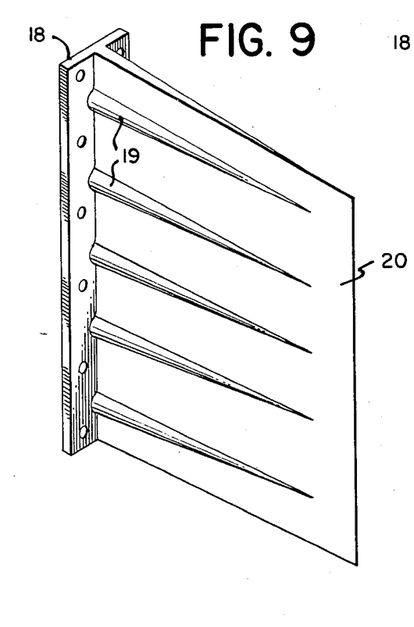
FIG. 9 is a perspective of a solid baffle having a continually varying section of a semi-rigid material.

FIG. 9 shows a gap filling vortex stabilizer 20 for mounting to the rear of the tractor or the front of the trailer. A rubber or plastic compound such as polyethylene may be used. The heavier section near the mounting flange 18, is relatively stiff because of its thickness, while the thin section at the opposite edge is very flexible and therefore capable of bending during an interference mode. Supplementory ribs or corrugations 19, may be introduced to produce the required variable flexibility.

Figure 10:
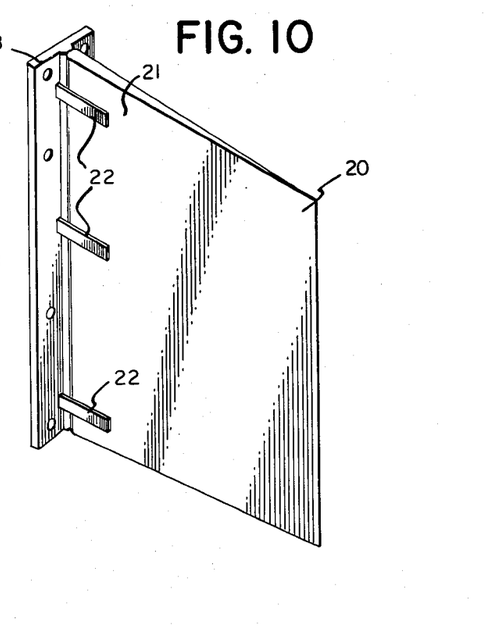
FIG. 10 is a perspective of a solid baffle having center seeking hinges capable of 90° hinged movement.

FIG. 10 illustrates a semi-rigid vortex stabilizer 21 gap sealer of the same character as the unit shown in FIG. 9, except that the unit is hinged vertically at hinge points 22. The hinges are of a type that seek a normally centered position under spring or cam tension with a breakaway force sufficient to resist side wind loading but insufficient to resist mechanical interference between tractor and trailer. Edge 20 is relatively thin and flexible to allow for bending when the rig is in a pitched condition.

Figure 11:
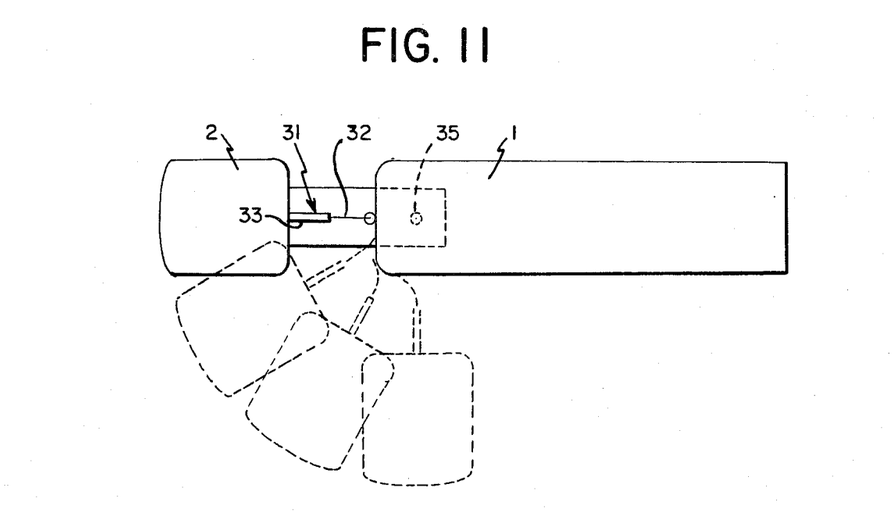
FIG. 11 is a top plan view of a tractor and semi-trailer with an alternative embodiment of the drag reducing apparatus of the present invention shown mounted to the tractor, with its deflecting capabilities shown in phantom.
Figure 12:
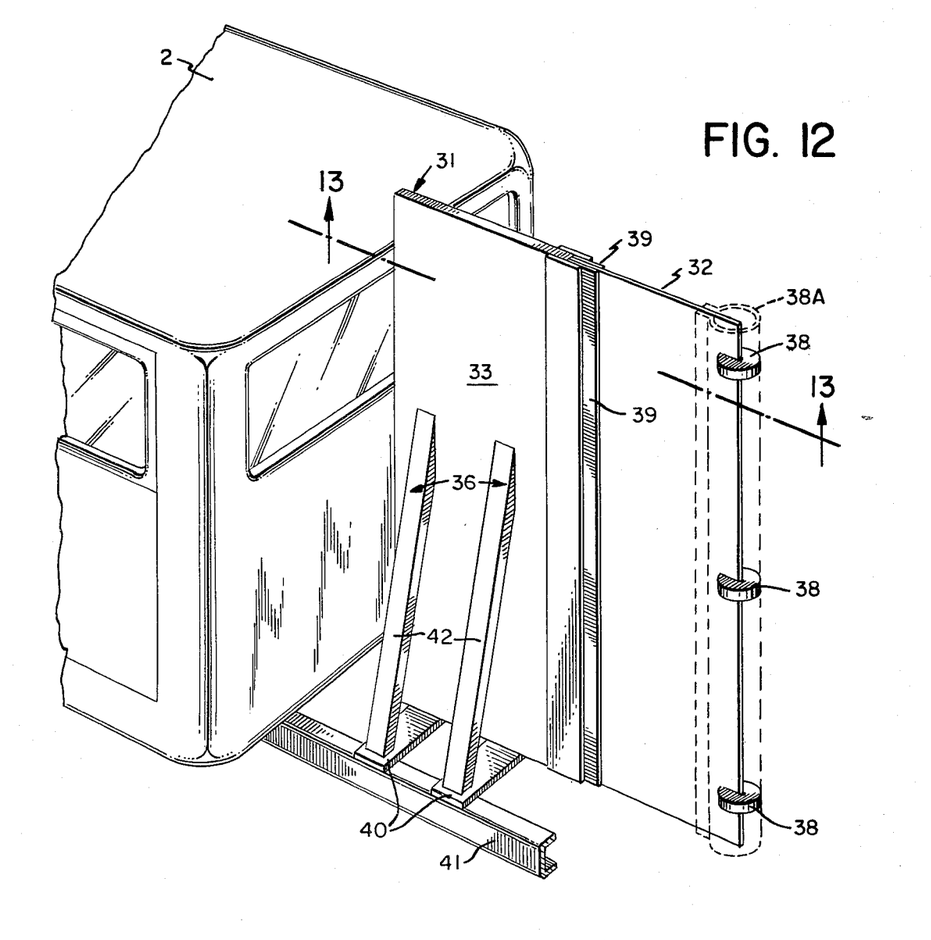
FIG. 12 is a perspective view, partially broken away, of a tractor with the drag reducing apparatus FIG. 11 mounted thereto.
Figure 13:
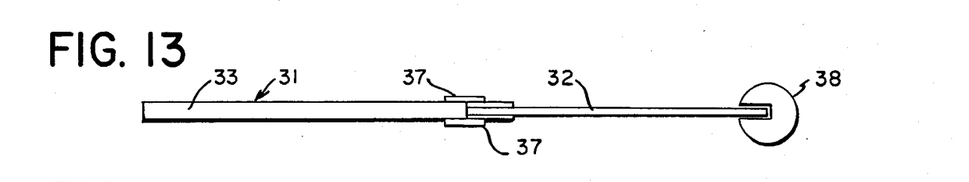
FIG. 13 is a cross-sectional top plan view of the drag reducing apparatus of FIG. 12 taken along line 13—13 of FIG. 12.

In FIGS. 11, 12, and 13, one embodiment of gap sealing drag reducer 31 is shown. In this embodiment, gap sealing drag reducer 31 incorporates a rigid portion 33 and a separate flexible portion 2.

Flexible portion 32 comprises a substantially uniform cross-sectional area and is constructed from material which resists bending when exposed to moderate loads while also flexibly bending under high pressure loads. This construction assures that gap sealing drag reducer 31 remains substantially stiff during normal driving when exposed to moderate to heavy crosswinds, while also being flexibly moveable when exposed to the high load pressure encountered when in contact with the tractor surfaces. Presently, high density semi-rigid polyethylene is preferred for flexible portion 32, but other similar materials such as rubber, polyvinylchloride, acetates, and polycarbonates, have been found to perform equally well.

The desired flexibility which flexible portion 32 must be capable of achieving can best be understood by referring to FIG. 11. As shown in phantom therein, tractor 2 incorporates a fifth wheel or pivot point 35 about which tractor 2 will arcuately turn.

As previously discussed, prior art vortex stabilizers are not capable of achieving complete gap closure due to the necessity for complete maneuverability of the tractor with respect to the trailer. This maneuverability has now been achieved by the present invention. In this particular embodiment of the present invention, the prior art problems are overcome by having a flexible portion 32 formed in gap sealer 31 which is capable of being laterally moveable in response to the forces generated during contact with the trailer surfaces. Furthermore, the lateral moveability and deflection of flexible member 32 is achieved without injury to either the trailer wall or flexible member 32.

In order to add further stiffening to flexible member 32 for bending resistance during heavy crosswinds, optional leaf springs 39 can be employed. As shown in FIGS. 12 and 13, leaf springs 39 are secured to rigid portion 33, by mounting means 37, extending therefrom partially along flexible member 32. It is important to note, however, the leaf springs 39, only extend a short distance along flexible member 32, in order to assure that leaf springs 39 will not contact the tractor surface.

In FIG. 12, optional support legs are shown. Support legs 36 incorporate base members 40, which are secured directly to chassis frame rails 41 of tractor 2, and upstanding leg portions 42, which are mounted directly to rigid member 33 of gap sealer 31. In certain situations, it may be more advantageous and convenient to mount gap sealing drag reducer 31 directly to chassis frame rails 41 instead of to the rear wall of tractor 2. If this is desired, support system 36 is easily employable to achieve this mounting situation. Although mounting system 36 has been shown and described in combination with gap sealing reducer 31, any of the other gap sealing drag reducing embodiments shown and disclosed in this present application can be similarly mounted.

In FIGS. 12 and 13, optional protective contact discs 38 are shown mounted to the exposed edge of flexible member 32 of gap sealing drag reducer 31. In the preferred embodiment, a plurality of protective contact discs 38 are mounted along the exposed edge of flexible member 32 in order to assist in the smooth, flexible deflected movement of gap sealing drag reducer 31 over any external trailer ribs and other trailer protuberances. Also, the use of discs 38 assures the existence of sufficient clearance between the edge of flexible portion 32 of gap sealer 31 and the trailer surface itself, thereby eliminating any possible chafing of electrical or pneumatic cables and hoses interconnected between the tractor and the trailer.

In FIGS. 14–17, alternative embodiments of the gap sealing drag reducer 31 are shown. In each of these embodiments, gap sealing drag reducer 31 comprises a rigid portion 33 and a flexible portion having a variety of dimensional and structural configurations. Each of these flexible members is secured to rigid member 33 by mounting means 37.

Figure 14:
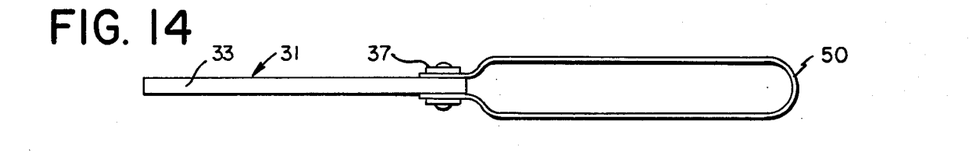
FIGS. 14-18 are cross-sectional top plan views of various alternative embodiments of the drag reducing apparatus of the present invention.
Figure 15:
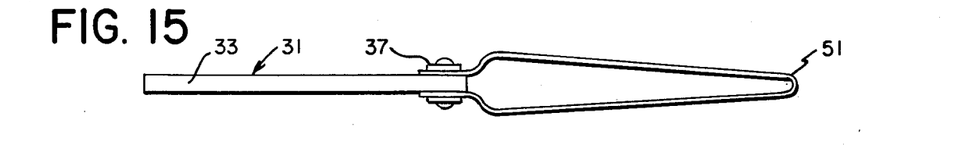

In FIG. 14, flexible member 50 comprises an overall elongated oval shape with rounded corners being incorporated therein. In FIG. 15, elongated tapered flexible member 51 is shown with a rounded terminating end. Similarly, in FIG. 16, elongated flexible member 52 is shown with a slightly tapered construction up to its terminating end which it is enlarged to form a substantially circular cross-sectional area. Although each of these flexible members differ in their physical appearance, they will provide bending resistance when exposed to heavy crosswinds, and supple damage-free flexibility when exposed to heavy pressures encountered when the trailer surfaces are physically contacted.

Figure 16:
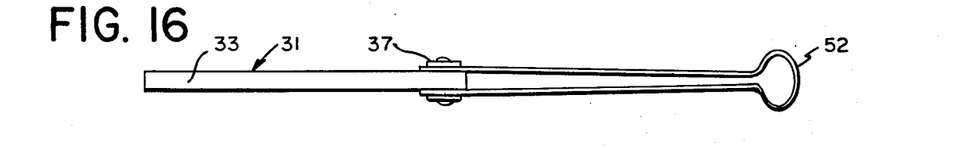

By employing flexible members 50, 51 or 52, the clearance provided by protective discs 38 for cable connections can be eliminated, since no chafing occurs with these configurations. It has been found that the chafing is eliminated due to the waxy, slippery nature of the polyethylene employed in the construction of flexible members. Furthermore, a spring support member interconnecting the flexible member with rigid member 33 is also unnecessary, since the elongated enlarged cross-sectional areas of the flexible members provide the stability required under the medium to heavy wind loads.

Figure 17:
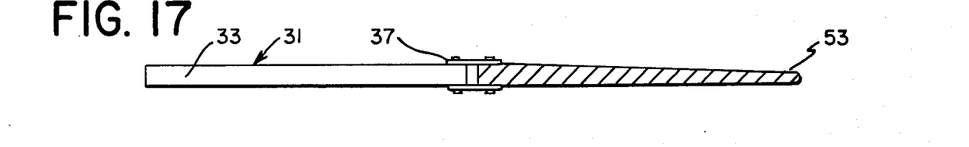

In FIG. 17, a substantially solid flexible member 53 is shown with a tapered cross-sectional area. By providing a root section 54 of flexible member 53 which is secured to rigid member 33 by fastening 37, the necessity for any leaf-spring device is eliminated. The root section 54 of flexible member 53 provides a desired stiffening effect in order to assure that flexible member 53 resists high wind forces which attempt to deflect it, while still being capable of damage-free deflection when the surface of flexible member 53 comes in contact with a surface of the trailer. Flexible member 53 may be tapered on both of its surfaces or may be a constant wall thickness, with a transversely corrugated or fluted construction.

Figure 18:
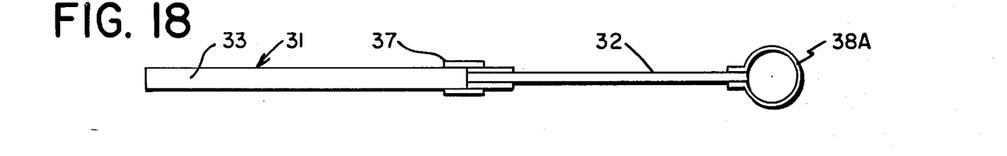

In FIG. 18, flexible member 32 of FIG. 12 is shown with an elongated, substantially circular cross-sectional, tubular member 38A mounted along the rear edge of flexible member 32. Tubular member 38A is also shown in FIG. 12 in phantom. In most applications, tubular member 38A is preferred for ease of installation and assurance of protection along the entire side edge of flexible member 32. Furthermore, tubular member 38A can be bolted or otherwise fastened directly to flexible member 32, thereby assuring its secure position retention.

Figure 19:
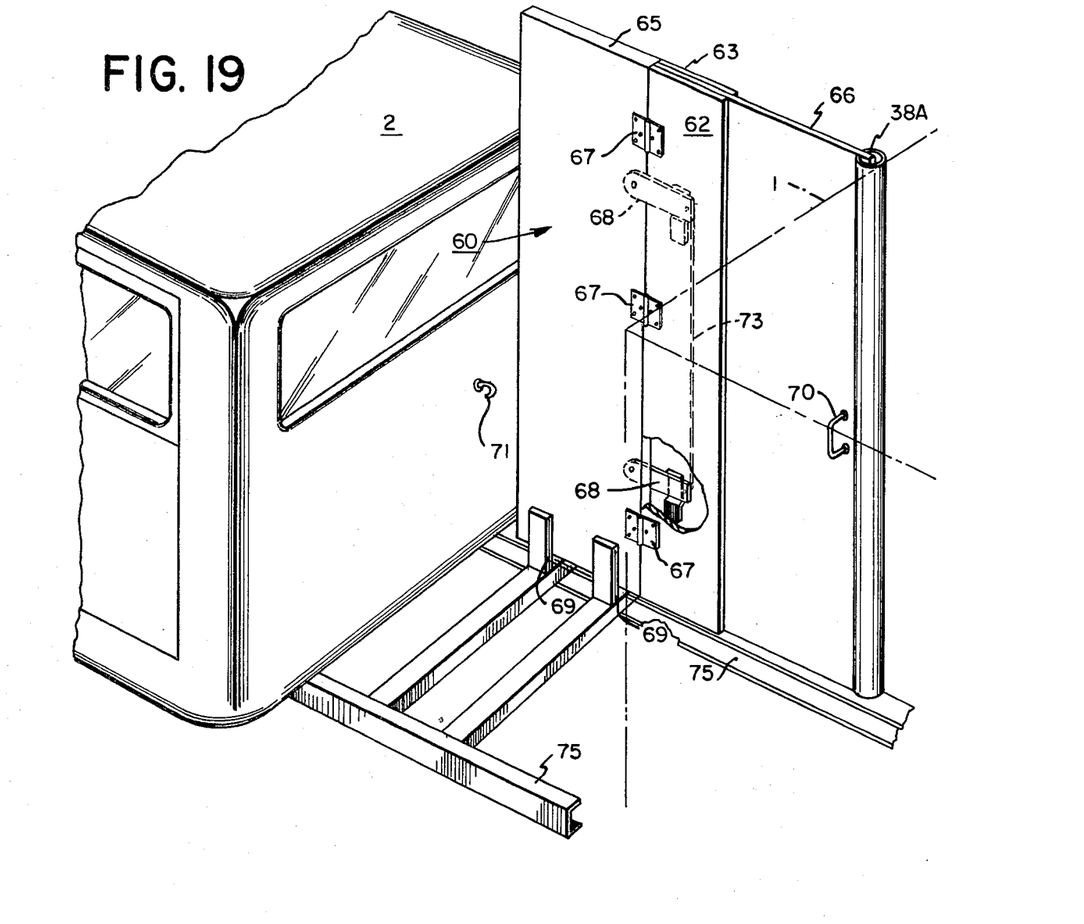
FIG. 19 is a perspective view, partially broken away, of a tractor with an alternative, foldable embodiment of the drag reducing apparatus of the present invention mounted therewith.
Figure 20:
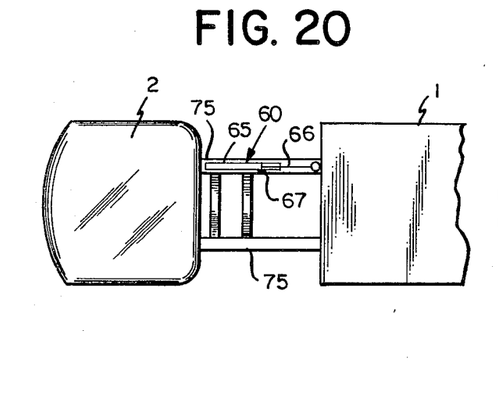
FIG. 20 is a top plan view of the drag reducer of FIG. 19 mounted in its extended position with a conventional trailer.
Figure 21:
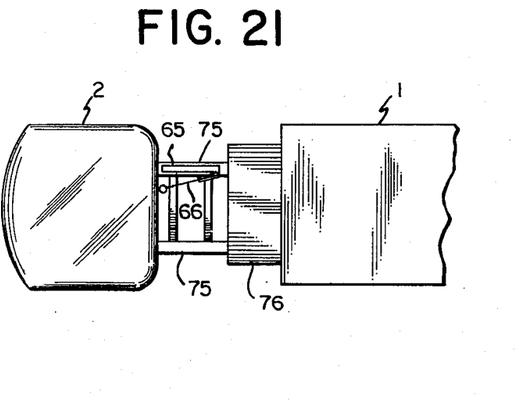
FIG. 21 is a top plan view of the drag reducer of FIG. 19 mounted in its folded position with a refrigerated trailer.

It has been found that the actual location of the gap sealing drag reducer of this invention in the gap between tractor 2 and trailer 1 is not a critical factor. Consequently, although the various embodiments of gap sealing drag reducer of this invention have been shown in the drawings of this disclosure in a position which is substantially along the center line of the sideto-side dimension of the gap. However, as shown in FIGS. 19, 20 and 21, the gap sealing drag reducer of the present invention can be also mounted along the chassis frame rail of tractor 2. In many situations, this position is extremely desirable since supporting hardware can be eliminated and the gap sealing drag reducer can be directly supportingly mounted to the chassis frame rail. Consequently, it should be clear that any of the embodiments of the gap sealing drag reducer of the present invention which are detailed in the other drawings are also capable of mounting along the chassis frame wall and, similarly, the embodiment of FIG. 19 can certainly be mounted in any alternative, desired position in the gap.

As discussed above, it has been found to be more economically feasible to mount the gap sealing drag reducer of the present invention to the tractor as opposed to the trailer. This has been found to be more desirable since most fleets have more tractors than trailers. Consequently, the tractors in any particular fleet are in comparative constant use, while many trailers may be unused.

Furthermore, it has been found that most fleets which carry general unrefrigerated cargo also have some refrigerated trailers. Consequently, although the various embodiments of the gap sealing drag reducer of this invention described in detail above could be employed with refrigerated trailers, a hinged, pivotable embodiment of the gap sealing drag reducer of this invention is preferred.

In FIGS. 19, 20 and 21, gap sealing drag reducer 60 is shown, incorporating a rigid portion 65 and a flexible portion 66 which is hingedly secured to rigid portion 65. In this way, drag reducer 60 is easily pivoted from a fully extended gap filling position to a folded, partial gap filling position. When drag reducer 60 is in the folded position, a conventional refrigerated trailer can be easily attached to the tractor.

As best seen in FIG. 19, the preferred embodiment for hingedly connecting flexible portion 66 with rigid portion 65 is achieved by sandwiching the hingedly connected end of flexible portion 66 between two support plates 62 and 63. Plates 62 and 63 are interconnected in order to assure secure and complete supportive maintenance of flexible portion 66 therebetween.

The assembly is then completed by mounting hinge means 67 along one edge of rigid member 65 and support plate 62. Although numerous hinge systems can be employed, FIG. 19 shows for simplicity, a plurality of typical hinges 67 mounted to rigid member 65 and support plate 62 along their substantially vertically disposed abutting edges.

In the preferred embodiment, the hinged gap sealing drag reducer 60 also incorporates locking means 68 for securely maintaining drag reducer 60 in its extended, gap-filling position. Although a plurality of locking apparatus can be employed, FIG. 19 depicts an arcuately pivotable bar and latch assembly 68 in which the bar is pivotally secured to rigid member 65 and the latch mechanism is mounted to support plate 63. In this way, pivotable gap sealing drag reducer 60 can be locked in its fully extended position using locking apparatus 68, and then when desired disengaging locking apparatus 68 and quickly and easily pivoting flexible member 66 about the vertical axis established by pivot means 67.

If desired, quick disconnect means 73 can be mounted to latch means 68 in order to allow simultaneous disconnection of both locking means in a single operation. Furthermore, foldback latching means 70 and 71 can also be incorporated in order to assure that flexible member 66 is securely maintained in the folded, pivoted, partial gap-filling position. Although a plurality of various securing means could be employed, a handle 70 and cooperating eyebolt 71 are shown as an example of the securement apparatus that can be used.

In FIGS. 19 and 20, hinged gap sealing drag reducer 60 is shown in its fully extended, gap-filling position, substantially closing the gap between tractor 2 and trailer 1. In FIG. 21, foldable, pivotable gap sealing drag reducer 60 is shown in its folded and latched configuration with refrigerator unit 76 mounted to trailer 1 and occupying a substantial portion of the gap area. With folded, pivotable gap sealing drag reducer 60 in its folded position, rigid member 65 and flexible member 66 substantially fill the exposed gap area and provide the gap-sealing effect for the reduction of drag as the refrigerated tractor and trailer combination moves through a fluid.

As shown in FIGS. 19, 20 and 21, the hinged, foldable gap sealing drag reducer 60 is mounted in the gap between tractor 2 and trailer 1 directly to one of the rearwardly extending chassis frame rails 75 of tractor 2. As shown in FIG. 19, gap sealing drag reducer 60 can be securely mounted to chassis frame rail 65 using support member 69 which are securely mounted to rigid member 65 as well as securely mounted to one of the chassis frame rails 75. However, as discussed above, although the mounting of drag reducer 60 to chassis frame rail 75 is preferred, drag reducer 60 can be mounted in the gap between tractor 2 and trailer 1 in any alternate location.

It has also been found that the leading edge of the gap sealing drag reducer of this invention can be spaced away from the rear wall of the tractor a distance of up to about 18 inches without substantially affecting the efficiency of the drag-reducer. Consequently, in many applications, the substantially solid plate, shown and thoroughly disclosed in the embodiments enumerated above, can be eliminated leaving only the flexible member substantially by itself serving as the gap sealing drag reducer.

Figure 22:
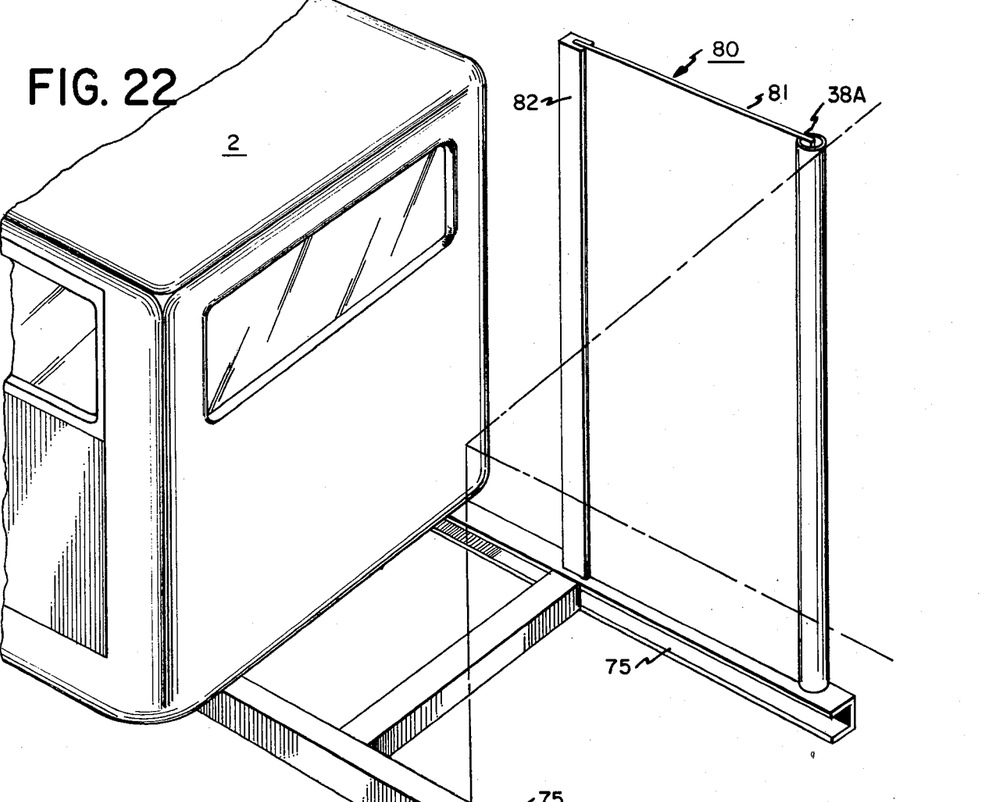
FIG. 22 is a perspective view, partially broken away, of a tractor with an alternative embodiment of the drag reducer of the present invention mounted therewith.

In FIG. 22, a gap sealing drag reducer 80 of this embodiment is shown. Gap sealing drag reducer 80 incorporates a flexible, bendable portion 81 which is securely mounted to a rigid supporting strut 82. Rigid supporting strut 82 is securely mounted to chassis frame rail 75, thereby providing a rigid, secure support system to which flexible portion 81 is securely held and about which flexible portion 81 is capable of freely arcuately bending.

As described above, in detailing the construction of gap sealing drag reducer 31 of FIG. 12 and 60 of FIG. 19, gap sealing drag reducer 80 comprises flexible portion 81 which is constructed from material which resists bending when exposed to moderate loads while also flexibly bending under higher pressure loads. As a result of this construction, flexible portion 81 remains substantially stiff and maintains the gap substantially closed during normal driving when flexible portion 81 is exposed to moderate to heavy crosswinds.

However, when higher pressure loads are encountered, generally experienced when contact is made with the tractor surface during parking maneuvers, flexible portion 81 flexibly moves out of position in order to prevent injury to the tractor surface. Generally, high density semi-rigid polyethylene is preferred for flexible portion 81, but other similar material such as rubber, polyvinylchloride, acetates, and polycarbonates have been found to perform equally well.

In the preferred embodiments, both gap sealing drag reducers 60 and 80 incorporate elongated protective end caps mounted to the rearwardly facing edges of flexible portions 66 and 81. As discussed above, end cap 38A preferably comprises a substantially circular cross-section and extends from the top to the bottom of flexible member 81 along the rear edge thereof. In this way, two-fold protection is provided, since both the trailer surface and the associated hardware are protected, as well as the edge of flexible portions 66 and 81. Furthermore, the bending movement of flexible portions 66 and 81 are assisted, and a smooth, flexible deflection of gap sealing drag reducers 60 and 80 are attained with protective cap 38A providing smooth continuous sliding movement over any external trailer ribs and all other trailer protuberances, as well as eliminating any possible chafing of electrical or pneumatic hoses interconnected between the tractor and the trailer. As thoroughly discussed above, in reference to FIGS. 13-17, any alternative construction for protective cap 38A can be employed as well as any alternative construction of flexible portions 66 and 81.

As shown in FIG. 12 and discussed above in reference thereto, gap sealing drag reducer of the present invention overcomes prior art drawbacks by providing a gap sealing structure which is capable of flexible maneuverability and lateral deflection in order to provide for the complete maneuverability of the tractor with respect to the trailer. As tractor 2 pivots with respect to trailer 1 about the fifth wheel or pivot point 35. Generally, it has been found that in order to provide a sufficient turning radius for tractor 2, the gap sealing drag reducers of this invention must incorporate a flexible portion having at least a 30 inch width. Although wider flexible members can be employed, it has been found that a 30 inch wide flexible member will be sufficient for use in any tractor-trailer combination regardless of the size of the gap between the tractor and the trailer.

Figure 23:
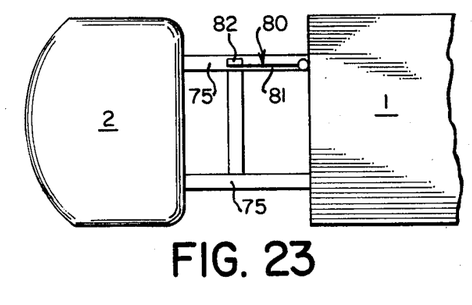
FIG. 23 is a top plan view of the drag reducer of FIG. 22 mounted in a gap of about 48 inches.
Figure 24:
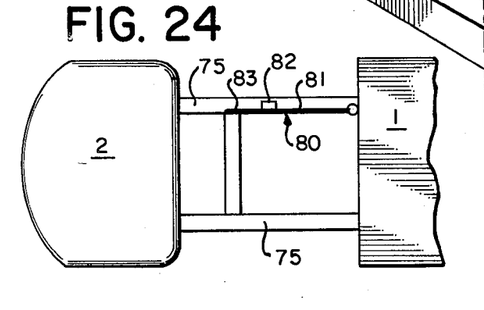
FIG. 24 is a top plan view of an alternative embodiment of the drag reducer of FIG. 22 mounted in a gap of about 60 inches.

By referring to FIGS. 23 and 24, the variations in construction and the general positioning of gap sealing drag reducer 80 can best be understood. In FIG. 23, a gap of substantially 48 inches is shown with gap sealing drag reducer 80 mounted therein. With any gap size up to about 48 inches, gap sealing drag reducer 80 need only comprise the substantially vertical support member 82 and the 30 inch wide flexible member 81.

As mentioned above, an 18 inch open area extending from the rear of the tractor to the leading edge of the gap sealing drag reducer has been found to only slightly affect the efficiency of the gap sealing drag reducer. Consequently, as shown in FIG. 23, gap sealing drag reducer 80 is mounted with an 18 inch open area extending from the rear surface of trailer 2 to the forward edge of support member 82. Clearly, in any gap size smaller than 48 inches, the same construction would be employed with vertical support member 82 being mounted to chassis frame rail 75 at a position closer to the rear surface of tractor 2. In this way, the 30 inch turning radius required for the free pivoting movement of tractor 2 with respect to trailer 1 would be consistently achieved with the same drag reducer construction.

In FIG. 24, gap sealing drag reducer 80 is shown mounted in a gap of about 60 inches. As shown therein, this embodiment of gap sealing drag reducer 80 comprises the 30 inch wide flexible portion 81 securely mounted to vertical upstanding support member 82. However, since this construction alone would leave an open distance of about 30 inches between tractor 2 and support strut 82, this embodiment also incorporates an additional forwardly extending gap sealing member 83, which is also securely mounted to vertical support member 82. In this way, an effective gap sealing drag reducer of 42 inches is achieved, leaving only about 18 inches of the gap which is not closed.

Of course, any desired dimension can be employed for extension portion 83, as well as any type of material. Since forwardly extending portion 83 does not flexibly move as the tractor-trailer is arcuately pivoted, extension portion 83 can comprise a solid member. However, it has been found that employing the same material as employed for flexible member 81 provides ease of assembly, as well as reduces the expense inherent in carrying additional stock items.

Furthermore, as would be clear to one skilled in the art, any width can be used for extension portion 83 in order to assure maximum open gap of about 18 inches. However, it has been found that in order to reduce unnecessary stock and maintain a simple catalogue of sizes, specifically sized extension portions 83 are employed for groups of gap widths. Furthermore, flexible member 81 can incorporate a width of about 36 or 40 inches. In this way, gap sealing drag reducers of this invention can be used in gaps ranging up to 100 inches.

As would be clear to one skilled in the art, flexible member 81 and extension portion 83 can comprise a single sheet of flexible material secured to support member 82 at the desired position. Alternatively, flexible member 81 and extension portions 83 can comprise separate, independent units of similar or completely different materials, with both members independently mounted to vertical support member 82. Any variety of these constructions can be used without, in any way, departing from the scope of this invention and without, in any way, affecting the performance characteristics of gap sealing drag reducer 80.

Figure 25:
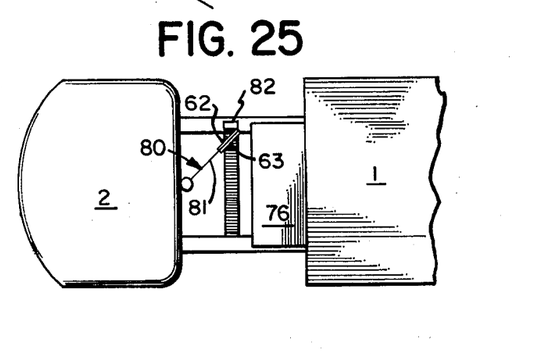
FIG. 25 is a top plan view of an alternative embodiment of the drag reducer of FIG. 22 mounted with a refrigerated trailer.

In FIG. 25, an alternative construction of gap sealing drag reducer 80 of this invention is shown. In this construction, flexible portion 81 is mounted to vertical support member 82 with pivot means and discussed in detail in reference to FIG. 19. As shown in FIG. 25, flexible member 81 would preferably be supportingly held by mounting plates 62 and 63 with the pivot means mounted between the cooperating edges of support member 82 and mounting plate 62.

With this construction, gap sealing drag reducer 80 could be employed for both conventional trailers, with flexible member 81 being pivoted and held in its elongated, gap sealing position, and then quickly folded into the position shown in FIG. 25 for connection of the tractor 2 with a trailer 1 having a refrigeration unit 76 extending therefrom. In this folded position, flexible member 81 would substantially seal the remaining gap, thereby assuring complete effective operation of the gap sealing drag reducer 80 as the tractor and refrigerated trailer combination move through a fluid.

Although various alternative embodiments for the gap sealing drag reducer of the present invention have been thoroughly discussed and described in this specification, it should be clear that a gap sealing drag reducer may incorporate any one of a number of the features disclosed and described in this specification without departing from the scope of this invention.

It will thus be seen that the objects set forth above, among those made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A drag reducer for mounting in the gap of a land vehicle wherein said gap is established by two surfaces defined by a rear panel of a leading element and a leading panel of a trailing element and for substantially reducing cross flow through the gap as the vehicle is moving through a fluid, said drag reducer comprising a substantially vertically disposed, fin-like effective gap sealing member mountable directly in the gap, and
   (A) having a forward edge in juxtaposed spaced relationship to said rear panel of the leading element,
   (B) extending therefrom substantially to the leading panel of the trailing element, in transverse air flow blocking relation to the leading and trailing elements, substantially completely filling the horizontal distance between said elements in a single, substantially vertical plane, and
   (C) incorporating a movable portion, said portion being flexibly laterally movable and angularly deflectable, with at leat one substantially vertical axis fixed relative to the leading element, thereby providing non-injurious deflection during relative angular movements of the leading and trailing elements.

2. The drag reducer defined in claim 1, wherein said drag reducer further comprises stiffening ribs for assuring the proper mix of rigidity and flexibility.

3. The drag reducer defined in claim 1, wherein said drag reducer is mounted along one vertical edge to a spring-biased flexible hinge assembly, and said hinge assembly is mounted to a first surface, whereby the entire flexible member is capable of pivoting movement about the vertical axis of the hinge assembly.

4. The drag reducer defined in claim 1, wherein said drag reducer is further defined as comprising interconnection means mounted along a vertical edge thereof for removably securing the drag reducer to said leading panel of the trailing element.

5. The drag reducer defined in claim 1, wherein the movable portion is further defined as comprising a plurality of longitudinal axes about which the movable portion is laterally movable and arcuately deflectable.

6. The drag reducer defined in claim 1, wherein the gap sealing member is further defined as being directly mounted to the rear panel of the leading element.

7. The drag reducer defined in claim 1, wherein the land vehicle is further defined as comprising substantially flat, horizontally extending frame rails defining the bottom plane of the gap, and the gap sealing member is further defined as being supportingly held in position by strut means affixed to the horizontally extending frame rails.

8. The drag reducer defined in claim 1, wherein the gap sealing member is mounted substantially along the central, rearwardly extending, vertical plane of the gap.

9. The drag reducer defined in claim 1, wherein the land vehicle comprises substantially flat, horizontally extending frame rails defining the bottom plane of the gap, and the gap sealing member is mounted directly to one of the frame rails.

10. The drag reducer defined in claim 1, wherein said gap sealing member is further defined as comprising a flexible portion forming the moveable portion, and a rigid portion.

11. The drag reducer defined in claim 10, wherein said flexible portion is further defined as comprising a first edge in secure abutting engagement with a first edge of the rigid member, and the second edge of the flexible member is in spaced juxtaposed relationship with the leading panel of the trailing element.

12. The drag reducer defined in claim 10, wherein said flexible portion is hingedly engaged with the rigid member.

13. The drag reducer defined in claim 10, wherein the rigid member comprises an upstanding, substantially vertically disposed, flat walled plate.

14. The drag reducer defined in claim 10, wherein the rigid member comprises a vertically disposed support strut.

15. A drag reducer for mounting in the gap of a land vehicle wherein said gap is established by two substantially vertical surfaces defined by a rear panel of a leading element and a leading panel of a trailing element, and for substantially reducing cross flow through the gap when the vehicle is moving through a fluid, said drag reducer comprising a substantially vertically disposed finlike gap sealing member mountable directly in the gap, and incorporating:
   (A) a housing mountable to the trailing panel of the leading element;
   (B) a flexible, foldable member, mounted along one vertical edge to said housing, and being unfoldably extendable to the leading panel of the trailing element, thereby substantially completely filling the gap between said surfaces; and
   (C) restraining means cooperatively associated with the flexible, foldable member for resisting and restricting undesirable wind induced lateral movement of the flexible, foldable member when operationally extended.

16. The drag reducer defined in claim 15, wherein said drag reducer further comprises:
   (C) attachment means mounted along the other vertical edge of said flexible member for cooperative interconnection and easy disconnection with securement means mounted on the second surface.

17. The drag reducer defined in claim 15, wherein said restraining means is further defined as being mounted to said housing and extending therefrom towards said leading panel of the trailing element along at least one side of said flexible member, thereby restricting the lateral wind produced movement of said flexible member.

18. The drag reducer defined in claim 15, wherein said flexible, foldable member is further defined as comprising an inflatable bladder.

19. The drag reducer defined in claim 18, wherein said drag reducer is further defined as comprising:
   (C) air inlet means communicating with said inflatable bladder for automatically inflatingly unfolding and extending said member towards said second surface; and (D) valve means connected to said air inlet means for regulating the inflatable air and venting to atmosphere for deflating.

20. A drag reducer for mounting in the gap of a land vehicle wherein said gap is established by two surfaces defined by a rear panel of a leading element and a leading panel of a trailing element, and for substantially reducing cross flow through the gap, as the vehicle is moving through a fluid said drag reducer comprising a substantially vertically disposed, fin-like effective gap sealing member mountable directly in the gap and incorporating:
(A) a rigid portion in spaced relationship with the rear panel of the leading element and
(B) a flexible portion
   (a) abuttingly engaged with the rigid portion,
   (b) extending therefrom substantially to the leading panel of the trailing element with the rear edge of the flexible portion in juxtaposed spaced relationship with the leading panel of the trailing element, and
   (c) laterally movable and angularly deflectable with at least one substantially vertical axis fixed relative to the leading element;
whereby the drag reducer effectively completely fills the horizontal distance between the two gap-forming surfaces, effectively blocking transverse air flow therethrough, while also providing non-injurious deflection when contact is made between the flexible portion and the leading panel of the trailing element.

21. The drag reducer defined in claim 20, wherein said gap sealing member is further defined as comprising spring means mounted to said rigid portion and extending along a portion of said flexible portion, thereby imparting greater rigidity and stability to said flexible portion.

22. The drag reducer defined in claim 20, wherein the flexible portion is hingedly mounted to the rigid portion, thereby providing a first extended position for cooperative drag reducing association with a conventional trailer, and a second, folded position for cooperative drag reducing association with a refrigerated trailer.

23. The drag reducer defined in claim 22, wherein said gap sealing member comprises locking means mounted between the rigid portion and the flexible portion to maintain the hingedly mounted flexible portion securely locked in at least one of its two positions.

24. The drag reducer defined in claim 23, wherein said gap sealing member also incorporates quick disconnect means cooperatively associated with said locking means for rapidly engaging and disengaging the locking means 25. The drag reducer defined in claim 22, wherein the gap sealing member further comprises securement apparatus having a first member mounted to the flexible portion and a second member cooperatively connectable with the first member and mounted to the rear wall of the tractor, thereby assuring secure maintainance of the flexible portion in the second, folded position.

26. The drag reducer defined in claim 20, wherein the gap sealing member is mounted substantially along the central, vertically disposed, rearwardly extending plane of the gap.

27. The drag reducer defined in claim 20, wherein the land vehicle is further defined as comprising substantially flat horizontally extending frame rails defining the bottom plane of the gap, and the gap sealing member is mounted directly to one of said frame rails.

28. The drag reducer defined in claim 20, wherein the leading edge of the gap sealing member is defined as being in substantially close proximity to the rear panel of the leading element, providing a gap sealing member substantially completely filling the longitudinal distance between the rear panel of the leading element and the leading panel of the trailing element.

29. The drag reducer defined in claim 20, wherein the forward edge of the gap sealing member is defined as being spaced away from the rear panel of the leading element a distance of about 18 inches.

30. The drag reducer defined in claim 20, wherein said rigid portion comprises a substantially vertically disposed flat wall plate member.

31. The drag reducer defined in claim 20, wherein said rigid member comprises a substantially vertically disposed supporting strut.

32. The drag reducer defined in claim 31, wherein said flexible portion is mounted to said supporting strut at a position between the two vertical edges thereof, thereby providing a forward leading edge of the flexible member spaced foward of the supporting strut with the rear edge of the flexible member spaced rearwardly of the supporting strut in juxtaposed spaced relationship to the leading panel of the trailing element.

33. The drag reducer defined in claim 20, wherein said flexible portion comprises a width of at least 30 inches.

34. The drag reducer defined in claim 20, wherein the gap sealing member further comprises:
(C) an extension portion
   (a) mounted along a rear edge thereof to the rigid portion,
   (b) extending therefrom toward the rear panel of the leading element,
   (c) comprising a forward edge in juxtaposed spaced relationship with the rear panel of the leading element.

35. The drag reducer defined in claim 34, wherein said extension portion comprises a substantially solid plate.

36. The drag reducer defined in claim 34, wherein said extension portion is manufactured from substantially flexible material.

37. The drag reducer defined in claim 20, wherein said gap sealing member is further defined as comprising protection discs mounted along the exposed edge of the flexible portion and positioned for non-injurious sliding engagement with the leading panel of the trailing element during deflective movement of said flexible portion.

38. The drag reducer defined in claim 20, wherein said flexible portion is further defined as comprising an enlarged cross-sectional area adjacent the interconnection zone between the flexible portion and the rigid portion, thereby assuring greater rigidity and stability of the flexible member when exposed to wind forces, while still providing lateral movability and pivotal articulation when directly contacted with the leading panel of the trailing element.

39. The drag reducer defined in claim 38, wherein said flexible portion is further defined as comprising a substantially solid, cross-sectional area.

40. The drag reducer defined in claim 38, wherein said flexible portion is further defined as comprising tapered configuration with the distance between the sides of the flexible portion decreasing towards the second edge of the flexible portion.

41. The drag reducer defined in claim 20, wherein the terminating end of the flexible portion adjacent the second edge is further defined as comprising an enlarged, rounded cross-sectional area.

* * * * *